US012561569B2

(12) United States Patent
Kobayashi

(10) Patent No.: US 12,561,569 B2
(45) Date of Patent: Feb. 24, 2026

(54) INFORMATION PROCESSING METHOD FOR REDUCING STORAGE REQUIREMENTS FOR WEIGHT PARAMETER VALUES OF LEARNED DATA SETS

(71) Applicant: NEC Corporation, Tokyo (JP)

(72) Inventor: Yuki Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 729 days.

(21) Appl. No.: 17/910,270

(22) PCT Filed: Mar. 26, 2020

(86) PCT No.: PCT/JP2020/013810
§ 371 (c)(1),
(2) Date: Sep. 8, 2022

(87) PCT Pub. No.: WO2021/192182
PCT Pub. Date: Sep. 30, 2021

(65) Prior Publication Data
US 2023/0087752 A1     Mar. 23, 2023

(51) Int. Cl.
*G06N 3/084* (2023.01)

(52) U.S. Cl.
CPC ..................................... *G06N 3/084* (2013.01)

(58) Field of Classification Search
CPC ...................................................... G06N 3/084
See application file for complete search history.

(56) References Cited

U.S. PATENT DOCUMENTS

| | | | |
|---|---|---|---|
| 2010/0010943 A1 | 1/2010 | Ito et al. | |
| 2021/0142177 A1* | 5/2021 | Mallya ................... | G06N 3/082 |
| 2021/0182661 A1* | 6/2021 | Li ........................... | H04L 41/16 |
| 2021/0192357 A1* | 6/2021 | Sinha ..................... | G06N 3/088 |

FOREIGN PATENT DOCUMENTS

| | | |
|---|---|---|
| JP | 2010-020445 A | 1/2010 |
| JP | 2018-055259 A | 4/2018 |

OTHER PUBLICATIONS

Mary Phuong, Christoph Lampert, "Towards Understanding Knowledge Distillation", Proceedings of the 36th International Conference on Machine Learning, PMLR 97:5142-5151, 2019. (Year: 2019).*

(Continued)

*Primary Examiner* — James T Tsai

(74) *Attorney, Agent, or Firm* — Sughrue Mion, PLLC

(57) ABSTRACT

An information processing device 500 of the present invention includes a first learning means 521 for performing a first learning process by using a first learning data set to generate a first learning model including a first weight parameter, a second learning means 522 for performing a second learning process by using a second learning data set to generate a second learning model including a second weight parameter, and an arbitration means 523 for, when performing the first learning process and the second learning process, updating the first weight parameter and the second weight parameter such that the values of the first weight parameter and the second weight parameter become almost the same.

6 Claims, 10 Drawing Sheets

(56) References Cited

OTHER PUBLICATIONS

B. Heo, J. Kim, S. Yun, H. Park, N. Kwak and J. Y. Choi, "A Comprehensive Overhaul of Feature Distillation," 2019 IEEE/CVF International Conference on Computer Vision (ICCV), Seoul, Korea (South), 2019, pp. 1921-1930, doi: 10.1109/ICCV.2019.00201. (Year: 2019).*

International Search Report for PCT Application No. PCT/JP2020/013810, mailed on Jul. 14, 2022.

Song Han et al., "Deep Compression: Compressing Deep Neural Networkswith Pruning, Trained Quantization and Huffman Coding", ICLR 2016, 2016, pp. 1-14.

Xiaoxi He et al., "Multi-Task Zipping via Layer-wise Neuron Sharing", 32nd Conference on Neural Information Processing Systems (NeurIPS2018), Montréal, Canada, arXiv.org [online], arXiv: 1805.09791v2, Cornell University, Mar. 2019, pp. 1-11, [retrieval date Jun. 29, 2020], internet<URL:https://arxiv.org/pdf/1805.09791v2> chapters 1, 3.

* cited by examiner

| Step | λ | β | param1cur | param2cur | grad1 | grad2 | arggrad1 | arggrad2 |
|------|-----|-----|-----------|-----------|-------|-------|----------|----------|
| 1 | 0.8 | 0.4 | 30.0 | 70.0 | +20.0 | −40.0 | +12.0 | −28.0 |
| 2 | 0.8 | 0.4 | 39.6 | 47.6 | +12.0 | −18.0 | +3.2 | −4.8 |
| 3 | 0.8 | 0.4 | 42.2 | 43.8 | +10.0 | −12.0 | +1.8 | +0.2 |
| 4 | 0.8 | 0.4 | 43.6 | 44.0 | +6.0 | −12.0 | −1.1 | −1.4 |
| 5 | 0.8 | 0.4 | 42.8 | 42.8 | ... | ... | ... | ... |
| 6 | 0.8 | 0.4 | ... | ... | ... | ... | ... | ... |

| ADDRESS | DATA |
|---------|------|
| 0b000 | 0x12345678 |
| 0b001 | 0x45678901 |
| 0b010 | 0x78901234 |
| 0b011 | 0x12345678 |
| 0b100 | 0x45678901 |
| 0b101 | 0x12345678 |
| 0b110 | 0x12345678 |
| 0b111 | 0x78901234 |

| ADDRESS | INDEX |
|---------|-------|
| 0b000 | 0 |
| 0b001 | 1 |
| 0b010 | 2 |
| 0b011 | 0 |
| 0b100 | 1 |
| 0b101 | 0 |
| 0b110 | 0 |
| 0b111 | 2 |

| INDEX | DATA |
|-------|------|
| 0 | 0x12345678 |
| 1 | 0x45678901 |
| 2 | 0x78901234 |

INFORMATION PROCESSING METHOD FOR REDUCING STORAGE REQUIREMENTS FOR WEIGHT PARAMETER VALUES OF LEARNED DATA SETS

This application is a National Stage Entry of PCT/JP2020/013810 filed on Mar. 26, 2020, the contents of all of which are incorporated herein by reference, in their entirety.

TECHNICAL FIELD

The present invention relates to an information processing method, an information processing device, and a program for performing deep learning.

BACKGROUND ART

In recent years, development in deep learning represented by a convolutional neural network (CNN) is remarkable, and the performance required for deep learning is increasingly higher. In particular, in an edge device such as a monitoring camera, it is important to realize high performance required for the latest deep learning algorithm with minimum power consumption.

In the case of performing deep learning by an edge device, various methods may be considered, including a method using a general-purpose processor, a method using a GPU for an edge device, a method of using an application specific standard product (ASSP) for edge AI, and a method using a dedicated application specific integrated circuit (ASIC). In any case, the memory capacity for storing a learned model causes a problem. A learned model means a network structure configured of a convolution layer, a fully connected layer, and the like, and a group of weight parameters used in the respective layers. The problem of memory capacity is caused by the weight parameters.

For example, the number of weight parameters of VGG-16 that is a learned convolutional neural network configured of sixteen layers having been learned with a large-scale image data set, is 138 million pieces, and when they are stored in 4 bytes, 500 MG or larger capacity is required. This places a burden on an edge device whose memory capacity is limited. Further, in an edge device, a plurality of learned models may be used simultaneously or in a switching manner. As an example, assuming an edge device such as a monitoring camera, it is considered to prepare an object detection model for daytime and an object detection model for nighttime, and use them in a switching manner depending on the ambient brightness. In such a case, when a plurality of learned models are stored just as they are, the memory capacity is required for the number of models, which places a large burden on the edge device.

Here, as a method of reducing the size of a single learned model, a method called pruning has been known (Non-Patent Literature 1). This is a method of deleting weight parameters whose values are close to zero, which enables reduction of the capacity of single learned model. However, deletion of weight parameters may cause deterioration in the recognition accuracy and may require relearning for suppressing deterioration in the recognition accuracy. Note that since weight parameters to be deleted in a learned model are nonconsecutive, they are stored in the form of compressed sparse row (CSR) or the like.

Further, a method of transfer learning has also been known. In the transfer learning, the first layer group of a learned model is transferred, and only a layer in the latter stage such as a fully connected layer is learned again. With this method, the memory capacity for using a different learned model can be made efficient to some extent. There is also a method called distillation to generate a small deep learning model from a large deep learning model.

Non-Patent Literature 1: Song Han, Huizi Mao, William J. Dally: "Deep Compression: Compressing Deep Neural Network with Pruning, Trained Quantization and Huffman Coding", ICLR 2016

SUMMARY

However, in the case where the above-described transfer learning or distillation is not applicable and a plurality of learned models generated through relearning of the weight parameters of the entire layers with respect to different learning data sets are used, the conventional methods described above cannot be applied. As a result, a device on which the learned models are to be implemented as described above needs the memory capacity for the number of learned models. This causes a problem that the memory capacity cannot be reduced.

Therefore, an object of the present invention is to solve the above-described problem, that is, a problem that it is impossible to reduce the memory capacity when implementing a plurality of learned models on a device.

An information processing method, according to one aspect of the present invention, is configured to include performing a first learning process by using a first learning data set to generate a first learning model including a first weight parameter, and performing a second learning process by using a second learning data set to generate a second learning model including a second weight parameter, and when performing the first learning process and the second learning process, updating the first weight parameter and the second weight parameter such that the values of the first weight parameter and the second weight parameter become almost the same.

An information processing device, according to one aspect of the present invention, is configured to include a first learning means for performing a first learning process by using a first learning data set to generate a first learning model including a first weight parameter;

a second learning means for performing a second learning process by using a second learning data set to generate a second learning model including a second weight parameter; and an arbitration means for, when performing the first learning process and the second learning process, updating the first weight parameter and the second weight parameter such that the values of the first weight parameter and the second weight parameter become almost the same.

A program, according to one aspect of the present invention, is configured to cause an information processing device to realize a first learning means for performing a first learning process by using a first learning data set to generate a first learning model including a first weight parameter, a second learning means for performing a second learning process by using a second learning data set to generate a second learning model including a second weight parameter, and an arbitration means for, when performing the first learning process and the second learning process, updating the first weight parameter and the second weight parameter such that the values of the first weight parameter and the second weight parameter become almost the same.

With the configurations described above, the present invention can reduce the memory capacity when a plurality of learned models are implemented on a device.

BRIEF DESCRIPTION OF DRAWINGS

FIG. 2 is a block diagram illustrating a detailed configuration of the learning device disclosed in FIG. 1.

FIG. 5 illustrates a state of processing by the learning device disclosed in FIG. 1.

EXEMPLARY EMBODIMENTS

First Exemplary Embodiment

Figure 1:
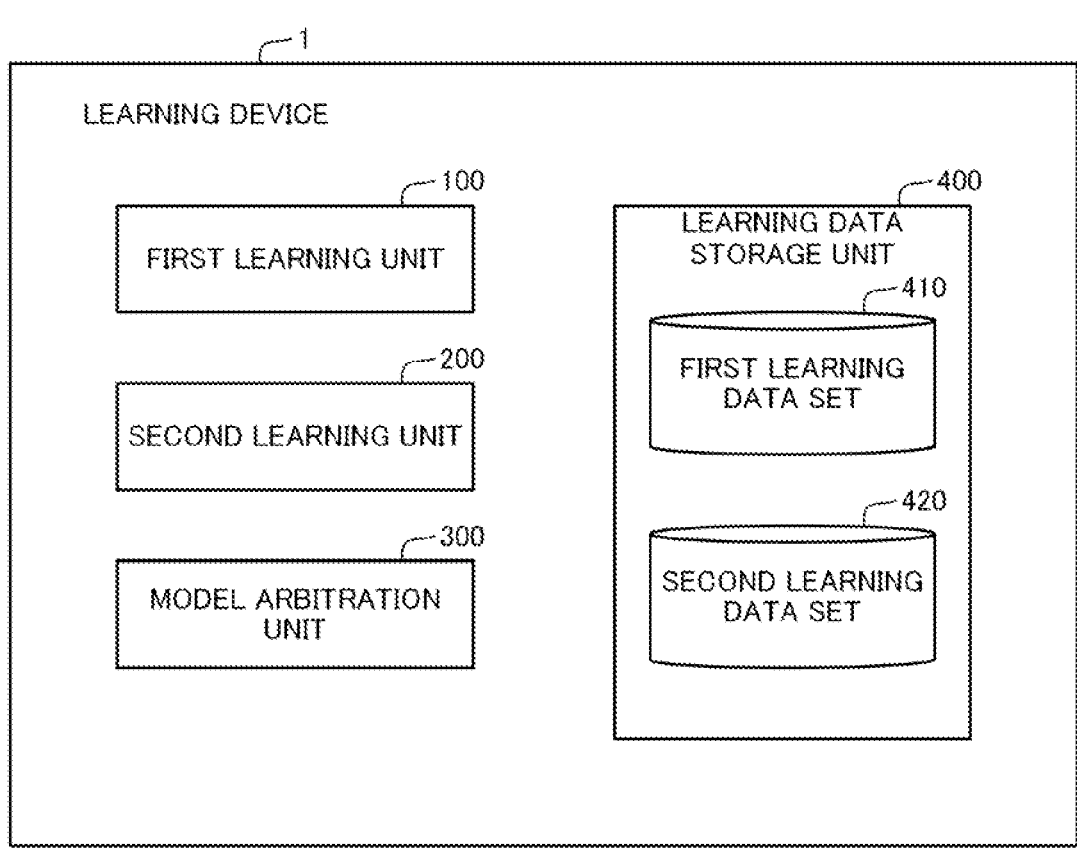
FIG. 1 is a block diagram illustrating a configuration of a leaning device according to a first exemplary embodiment of the present invention.
Figure 2:
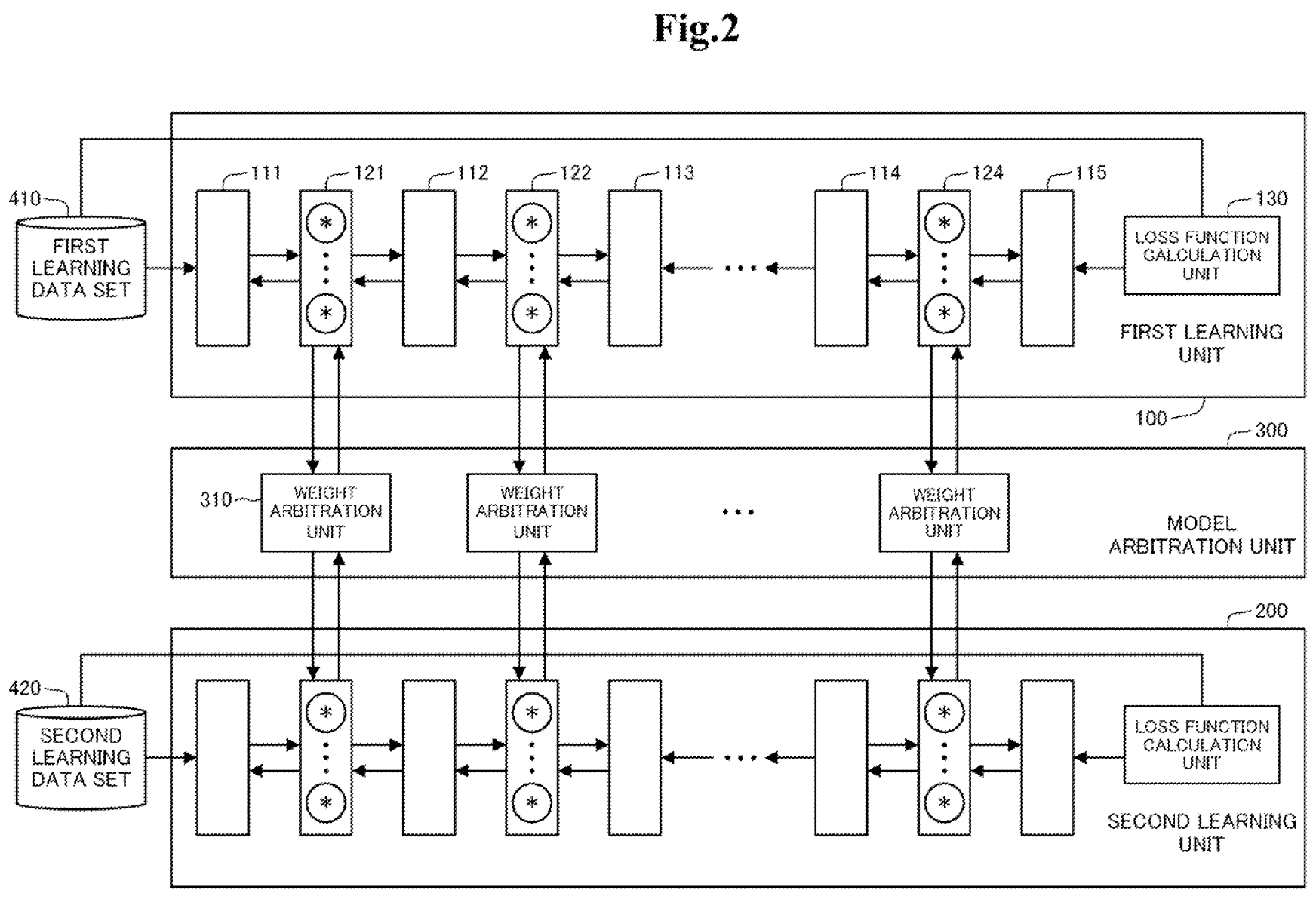
Figure 3:
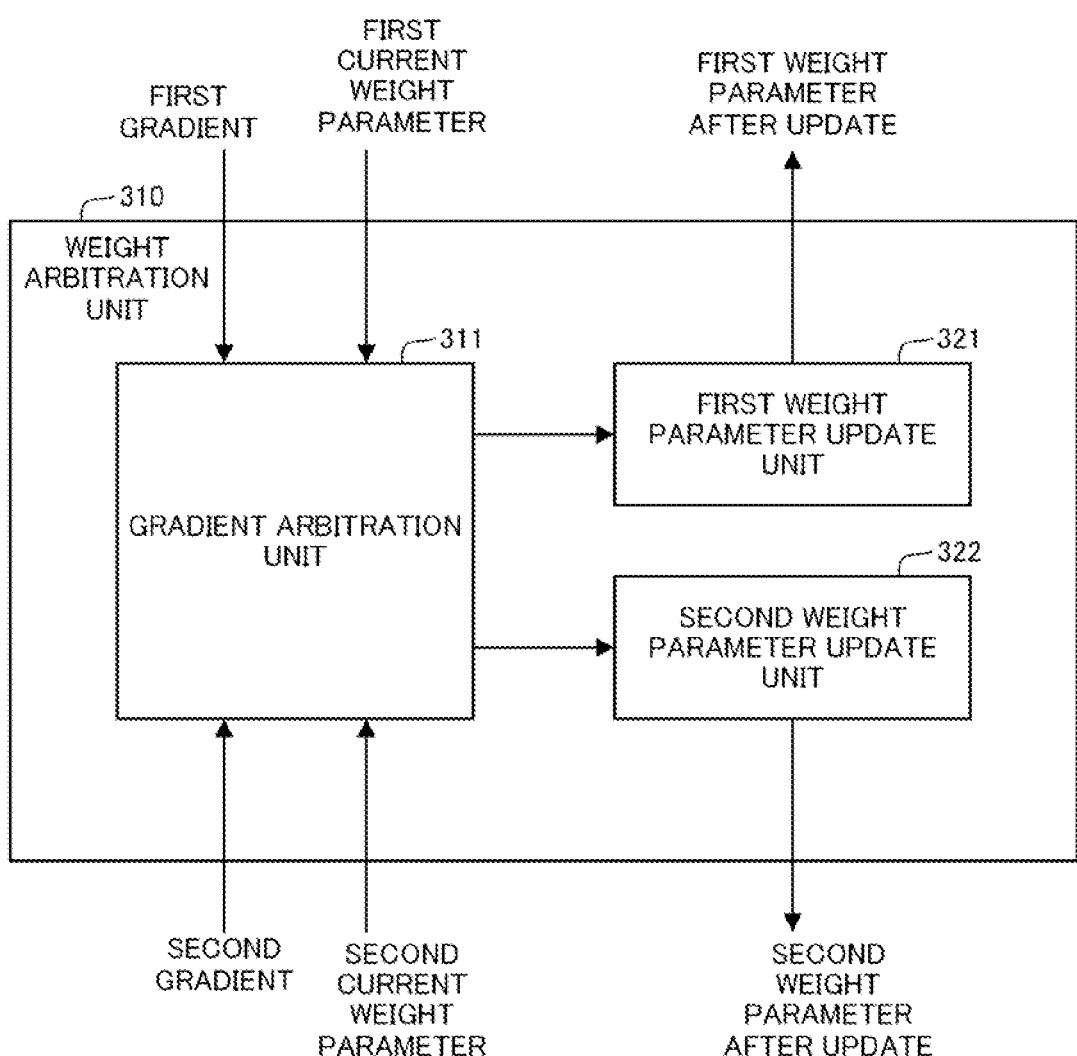
FIG. 3 is a block diagram illustrating a detailed configuration of a weight arbitration unit disclosed in FIG. 2.
Figure 4:
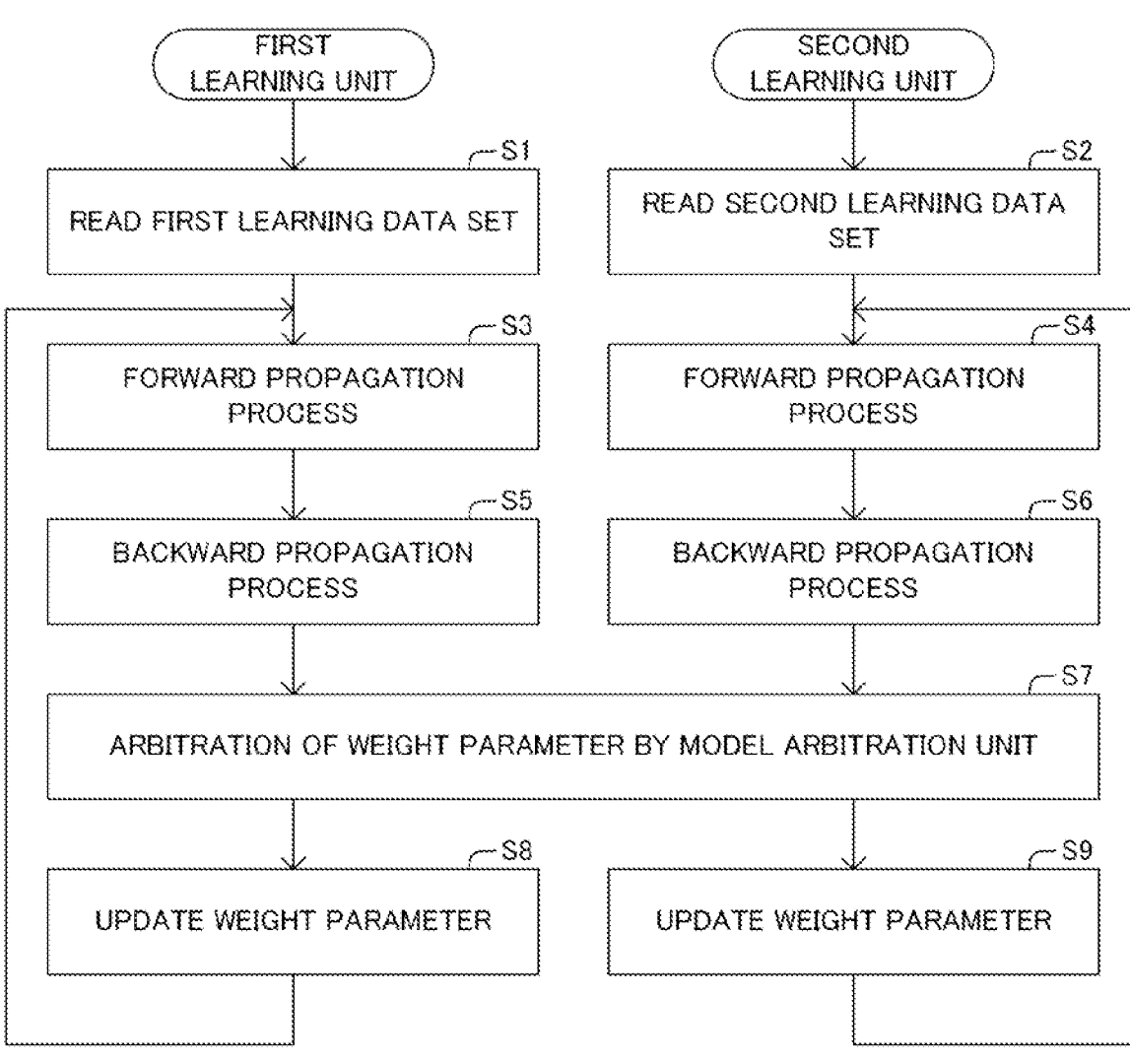
FIG. 4 is a flowchart illustrating an operation of the learning device disclosed in FIG. 1.
Figure 6:
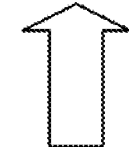
FIG. 6 is a diagram for explaining an effect of the learning device disclosed in FIG. 1.
Figure 7:
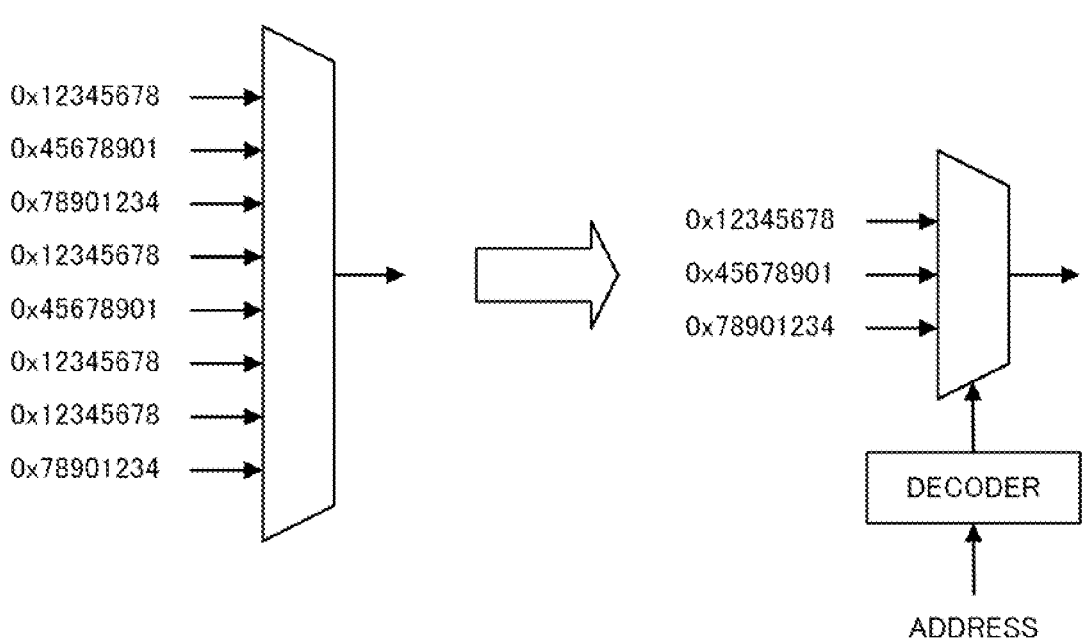
FIG. 7 is a diagram for explaining an effect of the learning device disclosed in FIG. 1.

A first exemplary embodiment of the present invention will be described with reference to FIGS. 1 to 7. FIGS. 1 to 3 are diagrams for explaining a configuration of a learning device, and FIGS. 4 and 5 are diagrams for explaining the processing operation of the learning device. FIGS. 6 and 7 are diagrams for explaining effects of the learning device. [Configuration]

A learning device 1 of the present invention is used for learning a learning model to be mounted on, for example, an edge device such as a monitoring camera. In particular, the learning device 1 has a function of generating learning models in such a manner that in the case of learning two learning models for example, weight parameters used in the respective learning models become the same value. As a result, it is possible to suppress data capacity of the weight parameters used in the respective learning models, and to reduce the memory capacity of the edge device. However, the learning model to be learned by the learning device 1 may have any contents, and may be used in any devices.

The learning device 1 is configured of one or a plurality of information processing devices each having an arithmetic device and a storage device. As illustrated in FIG. 1, the learning device 1 includes a first learning unit 100, a second learning unit 200, and a model arbitration unit 300. The respective functions of the first learning unit 100, the second learning unit 200, and the model arbitration unit 300 can be implemented through execution, by the arithmetic unit, of a program for realizing the respective functions stored in the storage device. The learning device 1 also includes a learning data storage unit 400. The learning data storage unit 400 is configured of a storage device, and stores therein a first learning data set 410 and a second learning data set 420. Hereinafter, the respective constituent elements will be described in detail.

The first learning unit 100 (first learning means) reads learning data and teacher data from the first learning data set 410, performs deep learning, and generates a learning model (first learning model). That is, with respect to certain learning data, the first learning unit 100 performs calculation of respective layers using a weight parameter (first weight parameter) in the current state, and obtains outputs up to the last layer (forward propagation process). Then, the first learning unit 100 compares the teacher data with the output of the last layer, and calculates the difference (gradient (first gradient)). Then, with the calculated gradient being used as an input, the first learning unit 100 performs inverse operation on each layer, and outputs the gradient from the weight parameter in each layer (backward propagation process). Such a series of operation is referred to as training of deep learning.

As similar to the first learning unit 100 described above, the second learning unit 200 (second learning means) reads learning data and teacher data from the second learning data set 420, performs deep learning, and generates a learning model (second learning model). That is, with respect to certain learning data, the second learning unit 200 performs calculation of respective layers using a weight parameter (second weight parameter) in the current state, and obtains outputs up to the last layer (forward propagation process). Then, the second learning unit 200 compares the teacher data with the output of the last layer, and calculates the difference (gradient (first gradient)). Then, with the calculated gradient being used as an input, the second learning unit 200 performs inverse operation on each layer, and outputs the gradient from the weight parameter in each layer (backward propagation process).

The model arbitration unit 300 (arbitration means) receives, for the respective layers of the first learning unit 100 and the second learning unit 200, weight parameters (first weight parameter, second weight parameter) and gradients (first gradient, second gradient) with respect to the weight parameters, as inputs. Then, after performing arbitration operation described below, the model arbitration unit 300 outputs values after update of the weight parameters with respect to the respective layers of the first learning unit 100 and the second learning unit 200. As described below, when the first learning unit 100 and the second learning unit 200 perform learning processes in parallel with each other under the arbitration by the model arbitration unit 300, the weight parameter (first weight parameter) of the first learning unit 100 and the weight parameter (second weight parameter) of the second learning unit 200 take a common value.

Next, the configurations of the first learning unit 100, the second learning unit 200, and the model arbitration unit 300 will be described in more detail.

As illustrated in FIG. 2, the first learning unit 100 includes intermediate layer storage units 111 to 115, intermediate layer operation units 121 to 124, and a loss function calculation unit 130. Then, the first learning unit 100 performs a learning process on a learning data set 140. Note that the learning data set is configured of learning data and teacher data. The learning data is input to the first intermediate layer storage unit 111, and the teacher data is input to the loss function calculation unit 130.

As described above, the first learning unit 100 repeats the forward propagation process and the backward propagation process alternately. First, in the forward propagation process, the intermediate layer operation unit 121 keeps the current value of the weight parameter (first weight parameter), performs convolution operation represented by Expression 1 provided below on the data input from the intermediate layer storage unit 111, and outputs it to the intermediate layer storage unit 112.

$$a_{j,k}^{l+1,i} = \sum_r \sum_s \sum_t W_{s,t}^{l,i,r} a_{j+s,k+t}^{l,r} \qquad \text{[Expression 1]}$$

Here, the term, shown as Expression 2 provided below, in Expression 1 represents data of the $r^{th}$ channel coordinate (j, k) stored in the intermediate layer storage of the first layer, and the term, shown as Expression 3 provided below, in Expression 1 is a weight parameter used for calculation of an output channel i with respect to the input channel r by the intermediate layer operation unit of the first layer.

$$a_{j,k}^{l,r} \qquad \text{[Expression 2]}$$

$$W_{s,t}^{l,i,r} \qquad \text{[Expression 3]}$$

The loss function calculation unit 130 receives an output from the last intermediate layer storage unit 115 and the teacher data from the first learning data set as inputs and calculates a loss function, and outputs a gradient that is a difference between the output of the intermediate layer and the teacher data to the intermediate layer storage unit 115.

On the contrary, in the backward propagation process, the intermediate layer operation unit 124 performs inverse convolution operation using the current value of the weight parameter held by it and the data input from the intermediate layer storage unit 115, and outputs the result to the intermediate layer storage unit 114. At the same time, the intermediate layer operation unit 124 calculates a gradient representing the difference from the current weight parameter, and outputs the gradient and the weight parameter to the model arbitration unit 300. Then, with the updated weight parameter returned from the model arbitration unit 300, the intermediate layer operation unit 124 updates the current weight parameter held by itself. Note that the other intermediate layer operation units 121 and 122 operate similarly.

The second learning unit 200 also has the same configuration as that of the first learning unit 100, as illustrated in FIG. 2.

As illustrated in FIG. 2, the model arbitration unit 300 includes a weight arbitration unit 310 corresponding to each layer of the first learning unit 100 and the second learning unit 200. As illustrated in FIG. 3, the weight arbitration unit 310 includes a gradient arbitration unit 311, a first weight parameter update unit 321, and a second weight parameter update unit 322.

The gradient arbitration unit 311 uses Expression 4 and Expression 5 provided below to calculate the gradient after the arbitration with respect to each weight parameter, and outputs it to the first weight parameter update unit 321 and the second weight parameter update unit 322.

arbgrad1=grad1+β{(param2_{cur}+grad2)−(param1_{cur}+
grad1)}       [Expression 4]

arbgrad2=grad2+(1−β){(param1_{cur}+grad1)−
(param2_{cur}+grad2)}       [Expression 5]

Here, "grad1" represents a gradient (first gradient) input from the first learning unit 100, and "grad2" represents a gradient (second gradient) input from the second learning unit 200. "Param1cur" represents a current weight parameter (first weight parameter) input from the first learning unit 100, and "param2cur" represents a current weight parameter (second weight parameter) input from the second learning unit 200. "Arbgrad1" represents a gradient after arbitration (first gradient after arbitration) with respect to the weight parameter of the first learning unit 100, and "arbgrad2" represents a gradient after arbitration (second gradient after arbitration) with respect to the weight parameter of the second learning unit 200. "β" represents a real number that is 0 or larger and 1 or smaller representing the priority between the first learning unit 100 and the second learning unit 200.

The first weight parameter update unit 321 uses Expression 6 provided below to calculate the weight parameter after the update (first weight parameter after update) in the first learning unit 100, on the basis of the gradient after arbitration calculated according to Expression 4 provided above, and the current weight parameter (first weight parameter) input from the first learning unit 100, and outputs it to the first learning unit 100.

param1_{new}=param1_{cur}+λarbgrad1       [Expression 6]

Here, "param1new" represents a weight parameter after update, "param1cur" represents a current weight parameter, "arbgrad1" represents a gradient after arbitration, and "λ" represents a learning rate that is a real number satisfying $0<λ<1$.

The second weight parameter update unit 322 uses Expression 7, provided below, to calculate the weight parameter after the update (second weight parameter after update) in the second learning unit 200, on the basis of the gradient after arbitration (second gradient after arbitration) calculated according to Expression 5 provided above, and the current weight parameter (second weight parameter) input from the second learning unit 200, and outputs it to the second learning unit 200.

param2_{new}=param2_{cur}+λarbgrad2       [Expression 7]

Here, "param2new" represents a weight parameter after update, "param2cur" represents a current weight parameter, "arbgrad2" represents a gradient after arbitration, and "λ" represents a learning rate that is a real number satisfying $0<λ<1$.

Note that while it has been described that the first learning unit 100 and the second learning unit 200 have the same network structure, the network structures thereof may be different. Furthermore, while an example in which learning is performed by the two learning units 100 and 200 in parallel with each other has been described, it is possible to include three or more learning units, perform learning by them in parallel with one another, and perform arbitration of the wright parameters in the respective learning units.

[Operation]

Next, operation of the learning device 1 will be described with mainly reference to the block diagram of FIG. 2 and the flowchart of FIG. 4. First, the first learning unit 100 reads data from the first learning data set 410 (step S1), and performs forward propagation process (step S3). In parallel with it, the second learning unit 200 reads data from the second learning data set 420 (step S2), and performs forward propagation process (step S4).

Then, the first learning unit 100 begins a backward propagation process (step S5). In parallel with it, the second learning unit 200 also begins a backward propagation process (step S6). Then, the first learning unit 100 and the second learning unit 200 each give gradients (first gradient, second gradient) obtained in the backward propagation processes to the model arbitration unit 300. The model arbitration unit 300 performs arbitration of the obtained gradients to calculate gradients after the arbitration, and updates respective wight parameters of the first learning unit 100 and the second learning unit 200 by using the gradients after the arbitration (step S7). Then, the model arbitration unit 300 returns the updated weight parameters to the first learning unit 100 and the second learning unit 200 respectively, and the first learning unit 100 and the second learning unit 200 update the respective weight parameters.

Next, specific operation of the model arbitration unit 300 will be described with reference to FIG. 5. Here, an example will be given in which "λ" in Expression 6 and Expression 7 is "0.8", "β" in Expression 4 and Expression 5 is "0.4", the initial value of the first weight parameter (param1cur) in the first learning unit 100 is "30", and the initial value of the second weight parameter (param2cur) in the second learning unit 200 is "70".

At Step 1 that is the first step, "param1cur" is "30" and "param2cur" is "70". At that time, in the backward propagation process, it is assumed that the first gradient "grad1" in the first learning unit 100 and the second gradient "grad2" in the second learning unit 200 are calculated to be "+20" and "−40", respectively. Then, based on Expression 4 and Expression 5 described above, a gradient after arbitration (first gradient after arbitration) "arbgrad1" corresponding to the weight parameter of the first learning unit 100 and a gradient after arbitration (second gradient after arbitration) "arbgrad2" corresponding to the weight parameter of the second learning unit 200 are calculated to be "+12" and "−28", respectively. Moreover, based on Expression 6 and Expression 7, the weight parameter after update (first weight parameter after update) "param1new" in the first learning unit 100 is calculated to be "39.6", the weight parameter after update (second weight parameter after update) "param2new" in the second learning unit 200 is calculated to be "47.6", and with the values of "param1new" and "param2new", the first weight parameter "param1cur" and the second weight parameter "param2cur" are updated.

Then at Step 2 that is the next step, in the backward propagation process, the gradients "grad1" and "grad2" are calculated to be "+12" and "−18" respectively. At that time, calculation is made similar to Step 1, and the first weight parameter "param1cur" and the second weight parameter "param2cur" are updated to "42.2" and "43.8", respectively. Note that the value of the gradient "grad1" is calculated while being affected by another weight parameter in the first learning unit 100, the sum of a weight parameter and a gradient in a step and the sum of a weight parameter and a gradient in another step are not always the same value.

As described above, along with the progress of the steps, in the example of FIG. 5, the value of the first weight parameter "param1cur" and the value of the second weight parameter "param2cur" become the same value at Step 5. Note that even when the values of the first weight parameter and the second weight parameter become the same, leaning does not always end. Further, there is no guarantee that the values of the two parameters always become the same as described above when the learning ends, and it is not necessary that the two parameters converge to the same value. In that case, when the difference between the values of the first weight parameter and the second weight parameter is small, they may be considered as the same. That is, the model arbitration unit 300 is not limited to perform update in such a manner that the values of the first weight parameter and the second weight parameter become completely the same. Even though there is a difference between them, when the difference falls within a range determined to be the same according to a predetermined reference, the model arbitration unit 300 may perform update by considering the values as almost the same.

Note that the gradient after arbitration "arbgrad2" corresponding to the weight parameter of the second learning unit 200 may be calculated according to Expression 8 provided below. In that case, "β" is defined as a real number of 0 or larger and 1 or smaller representing the priority of the focused learning unit relative to the other learning unit.

$$\text{arbgrad2}=\text{grad2}+\beta\{(\text{param1}_{cur}+\text{grad1})-(\text{param2}_{cur}+\text{grad2})\} \qquad \text{[Expression 8]}$$

[Advantageous Effects]

Next, advantageous effects of the present embodiment will be described with reference to FIGS. 6 and 7. Since the present embodiment is configured to perform learning so as to allow the weight parameters of the two learned models to have commonality, that is, become almost the same, it is possible to reduce the memory capacity required for storing the weight parameters.

First, an example of reducing the memory capacity required for storing weight parameters will be shown by using FIG. 6. The left table in FIG. 6 illustrates an example in which eight pieces of 32-bit data are stored in addresses 0b000 to 0b111. Here, it is assumed that "0x" represents a hexadecimal number and "0b" represents a binary number. In this way, in the example on the left side in FIG. 6, the memory capacity of 8×32=256 bits is required.

On the other hand, in the first table on the right side in FIG. 6, the memory capacity is reduced by using redundancy of the data. For example, since the pieces of data with respect to addresses 0b000, 0b011, 0b101, and 0b110 have the same value 0x12345678, only the index 0 is stored. Then, in the second table on the right side in FIG. 6, as data corresponding to the index 0, 0x12345678 is stored. In this example, since there are only three types of indexes, the bit width required for storing the indexes are 2 bits at most. In the example shown on the right side in FIG. 6, the total memory capacity is 8×2+3×32=112 bits. Therefore, the memory capacity can be reduced significantly from 256 bits.

Further, FIG. 7 illustrates an example of reducing the memory capacity required for storing weight parameters by using a combination circuit. The example illustrated on the left side of FIG. 7 shows a circuit that uses eight input selectors to select and output eight pieces of 32-bit data. On the other hand, in the example illustrated on the right side in FIG. 7, three input selectors and a decode circuit for decoding addresses are used to realize the same function as that illustrated on the left side in FIG. 7.

For example, the decoder can be realized by the following simple circuit:
0b10 when (addr==0b010) or (addr==0b111) else
0b01 when (addr==0b001) or (addr==0b100) else
0b00
The memory capacity (circuit scale) can be reduced as compared with the example illustrated on the left side in FIG. 7.

As described above, since the present embodiment is configured to perform learning so as to allow the weight parameters of a plurality of learned models to become almost the same, it is possible to reduce the memory capacity required for storing the weight parameters of a plurality of learned models.

Second Exemplary Embodiment

Figure 8:
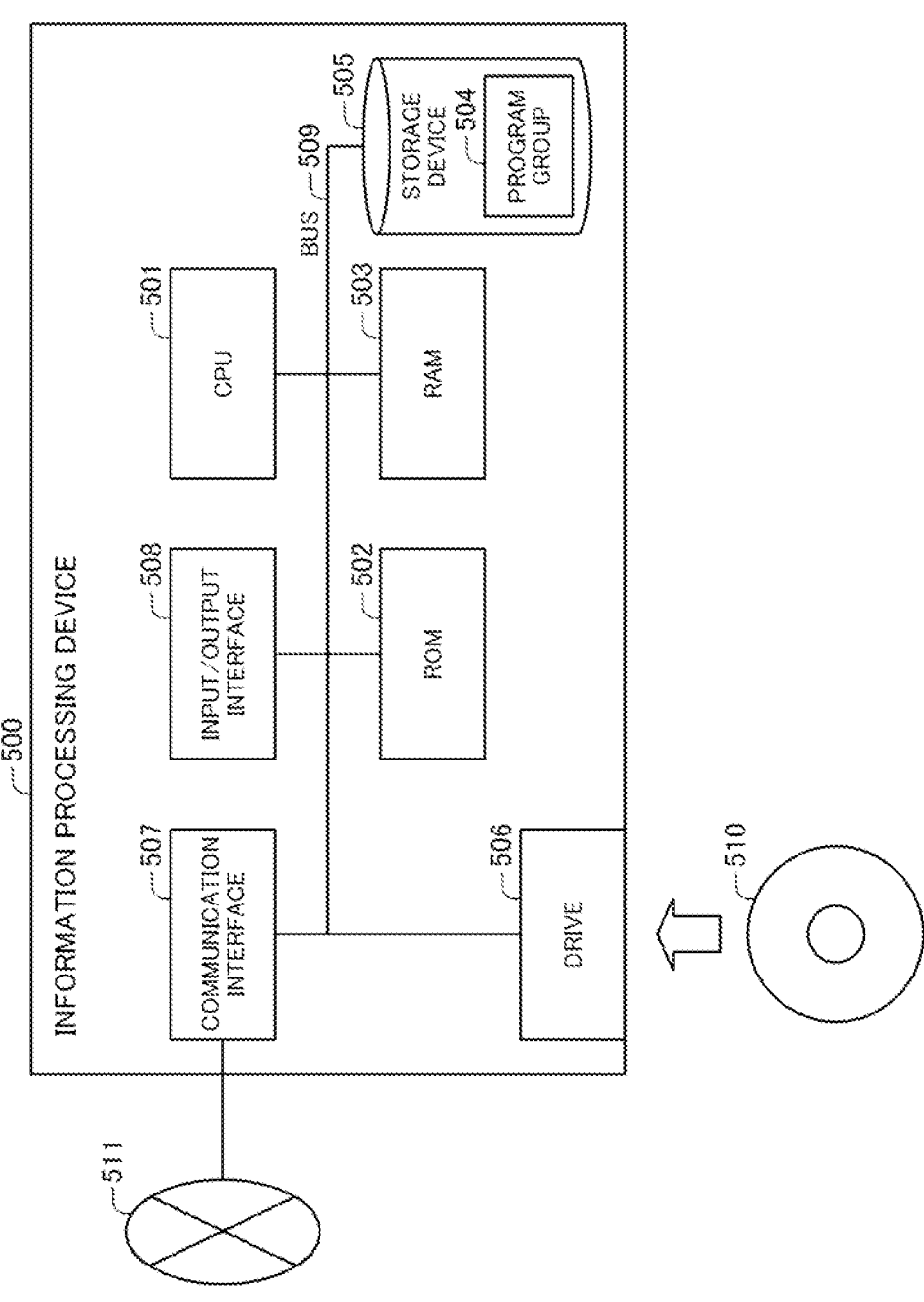
FIG. 8 is a block diagram illustrating a hardware configuration of an information processing device according to a second exemplary embodiment of the present invention.
Figure 9:
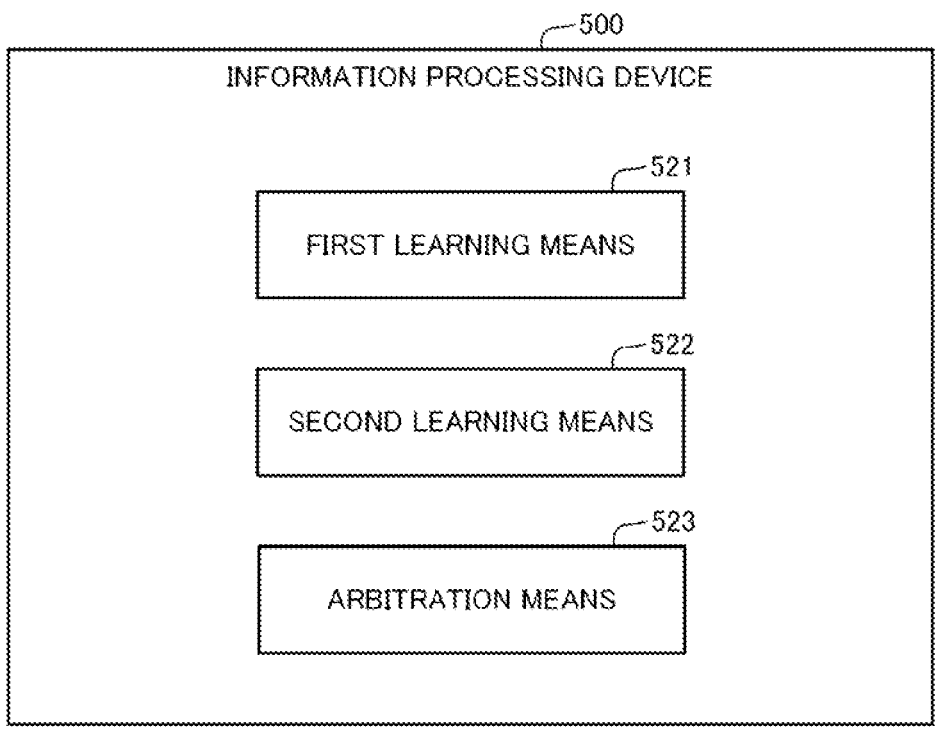
FIG. 9 is a block diagram illustrating a configuration of the information processing device according to the second exemplary embodiment of the present invention.
Figure 10:
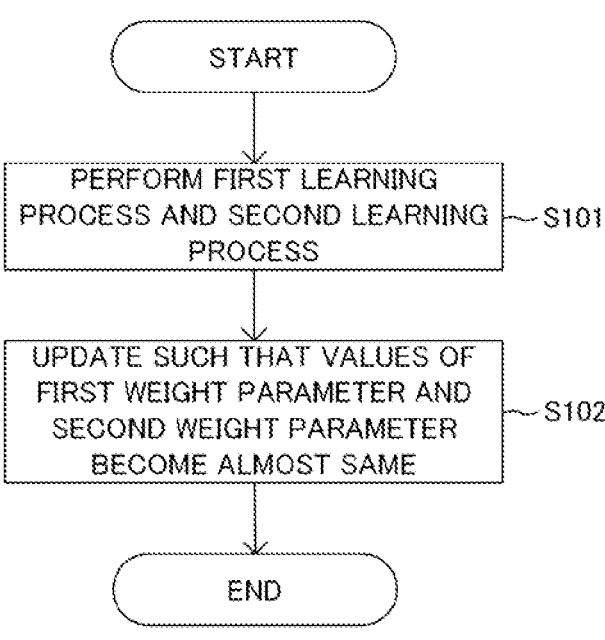
FIG. 10 is a flowchart illustrating an operation of the information processing device according to the second exemplary embodiment of the present invention.

Next, a second exemplary embodiment of the present invention will be described with reference to FIGS. 8 to 10. FIGS. 8 and 9 are block diagrams illustrating the configuration of an information processing device according to the second exemplary embodiment, and FIG. 10 is a flowchart illustrating the operation of the information processing device. Note that the present embodiment shows the outlines of the configurations of the learning device and the learning method described in the embodiment described above.

First, a hardware configuration of an information processing device 500 in the present embodiment will be described with reference to FIG. 8. The information processing device 500 is configured of a typical information processing device, having a hardware configuration as described below as an example.

Central Processing Unit (CPU) 501 (arithmetic device)
Read Only Memory (ROM) 502 (storage device)
Random Access Memory (RAM) 503 (storage device)
Program group 504 to be loaded to the RAM 503
Storage device 505 storing therein the program group 504
Drive 506 that performs reading and writing on a storage medium 510 outside the information processing device
Communication interface 507 connecting to a communication network 511 outside the information processing device
Input/output interface 508 for performing input/output of data
Bus 509 connecting the respective constituent elements
The information processing device 500 can construct, and can be equipped with, a first learning means 521, a second learning means 522, and an arbitration means 523 illustrated in FIG. 9, through acquisition and execution of the program group 504 by the CPU 501. Note that the program group 504 is stored in the storage device 505 or the ROM 502 in advance, and is loaded to the RAM 503 and executed by the CPU 501 as needed. Further, the program group 504 may be provided to the CPU 501 via the communication network 511, or may be stored on the storage medium 510 in advance and read out by the drive 506 and supplied to the CPU 501. However, the first learning means 521, the second learning means 522, and the arbitration means 523 may be constructed by dedicated electronic circuits for implementing such means.

Note that FIG. 8 illustrates an example of the hardware configuration of the information processing device 500. The hardware configuration of the information processing device is not limited to that described above. For example, the information processing device may be configured of part of the configuration described above, such as without the drive 506.

The information processing device 500 executes the information processing method illustrated in the flowchart of FIG. 20, by the functions of the first learning means 521, the second learning means 522, and the arbitration means 523 constructed by the program as described above.

As illustrated in FIG. 10, the information processing device 500 executes processing to perform a first learning process by using a first learning data set to generate a first learning model including a first weight parameter, and perform a second learning process by using a second learning data set to generate a second learning model including a second weight parameter (step S101), and when generating the first learning process and the second learning process, update the first weight parameter and the second weight parameter such that values of the first weight parameter and the second weight parameter become almost the same (step S102).

Since the present embodiment is configured as described above, learning is performed so as to allow the weight parameters of a plurality of learned models to become almost the same. Therefore, it is possible to reduce the memory capacity required for storing the weight parameters of a plurality of learned models.

Note that the program described above can be supplied to a computer by being stored in a non-transitory computer-readable medium of any type. Non-transitory computer-readable media include tangible storage media of various types. Examples of non-transitory computer-readable media include magnetic storage media (for example, flexible disk, magnetic tape, and hard disk drive), magneto-optical storage media (for example, magneto-optical disk), a CD-ROM (Read Only Memory), a CD-R, a CD-R/W, and semiconductor memories (for example, mask ROM, PROM (Programmable ROM), EPROM (Erasable PROM), a flash ROM, and a RAM (Random Access Memory)). Note that the program may be supplied to a computer by being stored in a transitory computer-readable medium of any type. Examples of transitory computer-readable media include electric signals, optical signals, and electromagnetic waves. A transitory computer-readable medium can be supplied to a computer via a wired communication channel such as a wire and an optical fiber, or a wireless communication channel.

While the present invention has been described with reference to the exemplary embodiments described above, the present invention is not limited to the above-described embodiments. The form and details of the present invention can be changed within the scope of the present invention in various manners that can be understood by those skilled in the art. Further, at least one of the functions of the first learning means 521, the second learning means 522, and the arbitration means 523 described above may be carried out by an information processing device provided and connected to any location on the network, that is, may be carried out by so-called cloud computing.

Supplementary Notes

The whole or part of the exemplary embodiments disclosed above can be described as the following supplementary notes. Hereinafter, outlines of the configurations of an information processing method, an information processing device, and a program, according to the present invention, will be described. However, the present invention is not limited to the configurations described below.
(Supplementary Note 1)
An information processing method comprising:
performing a first learning process by using a first learning data set to generate a first learning model including a first weight parameter, and performing a second learning process by using a second learning data set to generate a second learning model including a second weight parameter; and
when performing the first learning process and the second learning process, updating the first weight parameter and the second weight parameter such that values of the first weight parameter and the second weight parameter become almost same.

(Supplementary Note 2)

The information processing method according to supplementary note 1, further comprising:

as the first learning process, performing a forward propagation process by using the first weight parameter, and performing a backward propagation process to calculate a first gradient with respect to the first weight parameter;

as the second learning process, performing a forward propagation process by using the second weight parameter, and performing a backward propagation process to calculate a second gradient with respect to the second weight parameter; and by using the first weight parameter, the first gradient, the second weight parameter, and the second gradient, updating the first weight parameter and the second weight parameter such that the values of the first weight parameter and the second weight parameter become almost the same.

(Supplementary Note 3)

The information processing method according to supplementary note 2, further comprising by using the first weight parameter, the first gradient, the second weight parameter, and the second gradient, calculating a first gradient after arbitration and a second gradient after arbitration, and on a basis of the first gradient after the arbitration and the second gradient after the arbitration, updating the first weight parameter and the second weight parameter.

(Supplementary Note 4)

The information processing method according to supplementary note 3, further comprising calculating the first gradient after the arbitration and the second gradient after the arbitration according to $$G1n=G1+\beta\{(P2+G2)-(P1+G1)\}$$

$$G2n=G2+(1-\beta)\{(P1+G1)-(P2+G2)\}$$

where P1 represents the first weight parameter, G1 represents the first gradient, P2 represents the second weight parameter, G2 represents the second gradient, G1n represents the first gradient after the arbitration, G2n represents the second gradient after the arbitration, and $\beta(0\leq\beta\leq1)$ represents priority between the first learning process and the second learning process.

(Supplementary Note 5)

The information processing method according to supplementary note 3 or 4, further comprising updating the first weight parameter on a basis of the first weight parameter and the first gradient after the arbitration, and updating the second weight parameter on a basis of the second weight parameter and the second gradient after the arbitration.

(Supplementary Note 6)

The information processing method according to supplementary note 5, further comprising calculating a first weight parameter after the update and a second weight parameter after the update according to $$P1n=P1+\lambda \cdot G1n$$

$$P2n=P2+\lambda \cdot G2n$$

where P1 represents the first weight parameter, G1n represents the first gradient after the arbitration, P1n represents the first weight parameter after the update, P2 represents the second weight parameter, G2n represents the second gradient after the arbitration, P2n represents the second weight parameter after the update, and $\lambda(0<\lambda<1)$ represents a learning rate.

(Supplementary Note 7)

An information processing device comprising:

first learning means for performing a first learning process by using a first learning data set to generate a first learning model including a first weight parameter;

second learning means for performing a second learning process by using a second learning data set to generate a second learning model including a second weight parameter; and arbitration means for, when performing the first learning process and the second learning process, updating the first weight parameter and the second weight parameter such that values of the first weight parameter and the second weight parameter become almost same.

(Supplementary Note 8)

The information processing device according to supplementary note 7, wherein as the first learning process, the first learning means performs a forward propagation process by using the first weight parameter, and performs a backward propagation process to calculate a first gradient with respect to the first weight parameter, as the second learning process, the second learning means performs a forward propagation process by using the second weight parameter, and performs a backward propagation process to calculate a second gradient with respect to the second weight parameter, and by using the first weight parameter, the first gradient, the second weight parameter, and the second gradient, the arbitration means updates the first weight parameter and the second weight parameter such that the values of the first weight parameter and the second weight parameter become almost the same.

(Supplementary Note 8.1)

The information processing device according to supplementary note 8, wherein by using the first weight parameter, the first gradient, the second weight parameter, and the second gradient, the arbitration means calculates a first gradient after arbitration and a second gradient after arbitration, and on a basis of the first gradient after the arbitration and the second gradient after the arbitration, updates the first weight parameter and the second weight parameter.

(Supplementary Note 8.2)

The information processing device according to supplementary note 8.1, wherein the arbitration means calculates the first gradient after the arbitration and the second gradient after the arbitration according to $$G1n=G1+\beta\{(P2+G2)-(P1+G1)\}$$

$$G2n=G2+(1-\beta)\{(P1+G1)-(P2+G2)\}$$

where P1 represents the first weight parameter, G1 represents the first gradient, P2 represents the second weight parameter, G2 represents the second gradient, G1n represents the first gradient after the arbitration, G2n represents the second gradient after the arbitration, and $\beta(0\leq\beta\leq1)$ represents priority between the first learning process and the second learning process.

(Supplementary Note 8.3)

The information processing device according to supplementary note 8.1 or 8.2, wherein the arbitration means updates the first weight parameter on a basis of the first weight parameter and the first gradient after the arbitration, and updates the second weight parameter on a basis of the second weight parameter and the second gradient after the arbitration.

(Supplementary Note 8.4)

The information processing device according to supplementary note 8.3, wherein the arbitration means calculates a first weight parameter after the update and a second weight parameter after the update according to $$P1n = P1 + \lambda \cdot G1n$$

$$P2n = P2 + \lambda \cdot G2n$$

where P1 represents the first weight parameter, G1n represents the first gradient after the arbitration, P1n represents the first weight parameter after the update, P2 represents the second weight parameter, G2n represents the second gradient after the arbitration, P2n represents the second weight parameter after the update, and $\lambda (0 < \lambda < 1)$ represents a learning rate.

(Supplementary Note 9)

A computer-readable storage medium storing thereon a program for causing an information processing device to realize:

first learning means for performing a first learning process by using a first learning data set to generate a first learning model including a first weight parameter;

second learning means for performing a second learning process by using a second learning data set to generate a second learning model including a second weight parameter; and arbitration means for, when performing the first learning process and the second learning process, updating the first weight parameter and the second weight parameter such that values of the first weight parameter and the second weight parameter become almost same.

REFERENCE SIGNS LIST 1 learning device
100 first learning unit
111, 112, 113, 114, 115 intermediate layer storage unit
121, 122, 124 intermediate layer operation unit
130 Loss function calculation unit
200 second learning unit
300 model arbitration unit
310 weight arbitration unit
311 gradient arbitration unit
321 first weight parameter update unit
322 second weight parameter update unit
400 learning data storage unit
410 first learning data set
420 second learning data set
500 information processing device
501 CPU
502 ROM
503 RAM
504 program group
505 storage device
506 drive
507 communication interface
508 input/output interface 509 bus
510 storage medium
511 communication network
521 first learning means
522 second learning means
523 arbitration means

What is claimed is:

1. An information processing method of reducing a storage requirement for storing values of a first weight parameter and a second weight parameter, the information processing method comprising:

performing a first learning process by using a first learning data set to generate a first learning model including the first weight parameter, and the first learning process comprises performing a first forward propagation process, by using the first weight parameter, and performing a first backward propagation process to determine a first gradient with respect to the first weight parameter;

performing a second learning process by using a second learning data set to generate a second learning model including the second weight parameter, and the second learning process comprises performing a second forward propagation process, by using the second weight parameter, and performing a second backward propagation process to determine a second gradient with respect to the second weight parameter;

during the first learning process and the second learning process, implementing an arbitration comprising, by using the first weight parameter, the first gradient, the second weight parameter, and the second gradient, implementing a first update comprising updating the first weight parameter and the second weight parameter such that a first difference, between the values of the first weight parameter and the second weight parameter, is within a predetermined amount; and after implementing the first update, implementing a second update comprising:

determining, based on the first weight parameter, the second weight parameter, and the second gradient, a post-first update first gradient and a post-first update second gradient; and further updating, based on the post-first update first gradient and the post-first update second gradient, the first weight parameter and the second weight parameter such that a second difference, between the values of the first weight parameter and the second weight parameter, is less than the first difference.

2. The information processing method according to claim 1, further comprising:

calculating the post-first update first gradient and the post-first update second gradient after the arbitration according to $$G1n = G1 + \beta \{ (P2 + G2) - (P1 + G1) \}$$

$$G2n = G2 + (1 - \beta) \{ (P1 + G1) - (P2 + G2) \}$$

where P1 represents the first weight parameter, G1 represents the first gradient, P2 represents the second weight parameter, G2 represents the second gradient, G1n represents the post-first update first gradient, G2n represents the post-first update second gradient, and $\beta (0 \leq \beta \leq 1)$ represents priority between the first learning process and the second learning process.

3. The information processing method according to claim 1, further comprising:

updating the first weight parameter on a basis of the first weight parameter and the post-first update first gradient, and updating the second weight parameter on a basis of the second weight parameter and the post-first update second gradient.

4. The information processing method according to claim 3, further comprising:

calculating a first weight parameter after the update and a second weight parameter after the update according to $$P1n=P1+\lambda \cdot G1n$$

$$P2n=P2+\lambda \cdot G2n$$

where P1 represents the first weight parameter, G1n represents the post-first update first gradient, P1n represents the first weight parameter after the update, P2 represents the second weight parameter, G2n represents the post-first update second gradient, P2n represents the second weight parameter after the update, and $\lambda(0<\lambda<1)$ represents a learning rate.

5. An information processing device configured to reduce a storage requirement for storing values of a first weight parameter and a second weight parameter, the information processing device comprising:

at least one memory configured to store instructions; and at least one processor configured to execute instructions to:

perform a first learning process by using a first learning data set to generate a first learning model including first weight parameter, and the first learning process comprises performing a first forward propagation process, by using the first weight parameter, and performing a first backward propagation process to determine a first gradient with respect to the first weight parameter;

perform a second learning process by using a second learning data set to generate a second learning model including second weight parameter, and the second learning process comprises performing a second forward propagation process, by using the second weight parameter, and performing a second backward propagation process to determine a second gradient with respect to the second weight parameter;

during the first learning process and the second learning process, implement an arbitration comprising, by using the first weight parameter, the first gradient, the second weight parameter, and the second gradient, implementing a first update comprising updating the first weight parameter and the second weight parameter such that a first difference, between the values of the first weight parameter and the second weight parameter, is within a predetermined amount; and after implementing the first update, implement a second update comprising:

determining, based on the first weight parameter, the second weight parameter, and the second gradient, a post-first update first gradient and a post-first update second gradient; and further updating, based on the post-first update first gradient and the post-first update second gradient, the first weight parameter and the second weight parameter such that a second difference, between the values of the first weight parameter and the second weight parameter, is less than the first difference.

6. A non-transitory computer-readable storage medium storing thereon a program comprising instructions for causing an information processing device to reduce a storage requirement for storing values of a first weight parameter and a second weight parameter, the information processing method by executing processing to:

perform a first learning process by using a first learning data set to generate a first learning model including the first weight parameter, and the first learning process comprises performing a first forward propagation process, by using the first weight parameter, and performing a first backward propagation process to determine a first gradient with respect to the first weight parameter;

perform a second learning process by using a second learning data set to generate a second learning model including the second weight parameter, and the second learning process comprises performing a second forward propagation process, by using the second weight parameter, and performing a second backward propagation process to determine a second gradient with respect to the second weight parameter;

during the first learning process and the second learning process, implement an arbitration comprising, by using the first weight parameter, the first gradient, the second weight parameter, and the second gradient, implementing a first update comprising updating the first weight parameter and the second weight parameter such that a first difference, between the values of the first weight parameter and the second weight parameter, is within a predetermined amount; and after implementing the first update, implement a second update comprising:

determining, based on the first weight parameter, the second weight parameter, and the second gradient, a post-first update first gradient and a post-first update second gradient; and further updating, based on the post-first update first gradient and the post-first update second gradient, the first weight parameter and the second weight parameter such that a second difference, between the values of the first weight parameter and the second weight parameter, is less than the first difference.

* * * * *